(12) United States Patent
Temple

(10) Patent No.: US 7,681,924 B2
(45) Date of Patent: Mar. 23, 2010

(54) FUSED BUTT JOINT FOR PLASTIC PIPE

(75) Inventor: William J. Temple, Fort Collins, CO (US)

(73) Assignee: Fast Fusion, LLC, Palisade, CO (US)

( * ) Notice: Subject to any disclaimer, the term of this patent is extended or adjusted under 35 U.S.C. 154(b) by 927 days.

(21) Appl. No.: 11/255,047

(22) Filed: Oct. 19, 2005

(65) Prior Publication Data
US 2006/0032349 A1    Feb. 16, 2006

Related U.S. Application Data

(62) Division of application No. 10/384,916, filed on Mar. 6, 2003, now Pat. No. 6,994,766.

(60) Provisional application No. 60/363,126, filed on Mar. 8, 2002.

(51) Int. Cl.
*F16L 13/14* (2006.01)

(52) U.S. Cl. ............... 285/288.1; 156/304.2; 156/304.5

(58) Field of Classification Search ........... 285/21.1, 285/21.2, 21.3, 22, 288.1, 288.11, 289.1; 156/158, 304.2, 304.5, 304.6
See application file for complete search history.

(56) References Cited

U.S. PATENT DOCUMENTS

| | | | |
|---|---|---|---|
| 3,013,925 A * | 12/1961 | Larsen ................ 264/248 |
| 3,117,903 A * | 1/1964 | Hix ..................... 156/158 |
| 3,195,229 A * | 7/1965 | Culver ................. 228/169 |
| 4,043,574 A * | 8/1977 | Asano .................. 285/21.1 |
| 4,990,209 A * | 2/1991 | Rakes .................. 156/351 |
| 5,328,541 A * | 7/1994 | Usui et al. ........... 156/304.2 |
| 5,820,720 A * | 10/1998 | Campbell ............. 156/273.9 |
| 5,890,747 A * | 4/1999 | Brockhage .......... 285/123.2 |
| 5,975,590 A * | 11/1999 | Cowan et al. ....... 285/133.11 |
| 6,131,954 A * | 10/2000 | Campbell ............ 285/21.1 |
| 6,769,719 B2 * | 8/2004 | Genoni ................ 285/288.5 |
| 6,939,083 B2 * | 9/2005 | Tosi et al. ............ 405/170 |
| 7,011,343 B1 * | 3/2006 | Shah ................... 285/288.1 |
| 2005/0127668 A1 * | 6/2005 | Mobley et al. ...... 285/288.1 |
| 2007/0216159 A1 * | 9/2007 | Yoshihara et al. .. 285/288.1 |

FOREIGN PATENT DOCUMENTS

| | | | |
|---|---|---|---|
| EP | 0 546 854 A1 * | 6/1993 |
| EP | 0 662 389 A2 * | 7/1995 |
| WO | WO 88/06966 * | 9/1988 |

* cited by examiner

*Primary Examiner*—James M Hewitt
(74) *Attorney, Agent, or Firm*—Dinsmore & Shohl LLP; Monika J. Hussell, Esq.

(57) ABSTRACT

A method, apparatus, and design of a fusion welded pipe wherein the effects of an inner bead of the fusion weld are minimized. The internal shape of the pipe prior to welding may be configured in several different shapes so that the beads or lips produced by the fusion welding process are unobtrusive and do not interfere with the function of the pipe. In a likewise manner, the outer shape of the pipe prior to welding may be configured so that the lips are unobtrusive on the external surface of the pipe.

6 Claims, 15 Drawing Sheets

FUSED BUTT JOINT FOR PLASTIC PIPE

CROSS REFERENCE TO RELATED APPLICATIONS

The present application is based upon and claims the benefit of U.S. Utility patent application Ser. No. 10/384,916, filed Mar. 6, 2003, which claims priority of U.S. Provisional Patent Application Ser. No. 60/363,126 filed Mar. 8, 2002, the entire contents of all of which is hereby specifically incorporated by reference for all they disclose and teach.

BACKGROUND OF THE INVENTION a. Field of the Invention

The present invention pertains generally to the fusion of plastic pipe and specifically to the fusion of plastic pipe wherein seams created by the fusion process are minimized.

b. Description of the Background

Polyethylene pipe is used commercially for the construction of pipelines for various applications such as natural gas, water, sewer, and other materials. In addition, polyethylene pipe may be used as conduit to protect transmission cables such as high voltage electricity, fiber optic telecommunication, telephone, cable television, and other signal cables.

Polyethylene pipe is typically joined through a process called fusion welding, the most common joint being a butt joint. A butt joint is formed by holding the two sections of pipe rigidly, performing a facing operation to square the ends of the pipes and prepare the pipes for welding, then heating the prepared faces of the pipes on a hot plate to the melting point, removing the heating element, and forcing the two melted faces together. The resulting joint may be cooled before being subjected to any handling forces. The result is a fused joint that is as strong or stronger than the parent material and is very reliable.

U.S. Pat. No. 4,990,209 issued to George Rakes entitled "Self Propelled Fusion Machine" (Rakes) is a machine adapted to perform butt joints on polyethylene pipe as described above. Rakes is specifically incorporated herein by reference for all that it discloses and teaches. The Rakes machine performs the sequence of butt fusing in a semi automated fashion, with provisions for easily loading and unloading the pipe as it is welded. Additionally, the Rakes device performs the butt fusion process in an enclosed environment, adding to the consistency and throughput of the machine in all types of weather.

FIG. 1 illustrates cross section of a butt joint made on the Rakes machine or any similar machine common in the industry. A first pipe 102 and a second pipe 104 are joined at the weld line 106. During the fusion process, the material in the zone 108 is melted and then forced together. When the pipes 102 and 104 are forced together, excess melted material forms outer lips 110 and 112 and inner lips 114 and 116. The material along the weld line 106 solidly and rigidly joins together, forming a very strong and reliable joint.

The inner lips 114 and 116 can create problems in certain applications. For example, when a pipeline is used as a conduit, the maximum amount of wires or transmission cables that may be installed in the conduit are limited by the innermost diameter of the lips 114 and 116. In such cases, the pipeline constructor may be forced to use a larger diameter pipe to compensate for the effects of the lips 114 and 116.

The inner lips 114 and 116 may create problems when the pipe is used as a conduit. The lips 114 and 116 may catch or impede the cables or transmission lines when the lines are installed into the conduit after it is buried. In such cases, it would be advantageous to remove or minimize the lips 114 and 116.

The inner lips 114 and 116 may be cut away by inserting a cutter inside the pipe. Such an operation is time consuming and costly. Not only is it difficult to insert a cutter deep into the pipe, but the chips from the cutting operation may be difficult to remove completely.

In some cases, the inner lips 114 and 116 may impede the function of the pipe. For example, in the case of a sewer pipe wherein semi solid and other wastes in a water stream flow by gravity, the lips 114 and 116 may cause some of the wastes to collect and be prevented from flowing to their intended destination.

In some cases, the outer lips 110 and 112 may impede the function of the pipe. For example, when the assembled pipe is installed using a feeder system that moves and guides the pipe into position, the lips 110 and 112 around the outside of the pipe may catch on the feeder apparatus. In such cases, the lips 110 and 112 may be removed manually or with a machine as a secondary operation.

It would therefore be advantageous to provide a method of fusing pipe wherein the effects of lips commonly formed during the fusion process are minimized or eliminated. It would be further advantageous for the process of eliminating the effects of the lips to be simple, easy to implement, and consistent from weld to weld.

SUMMARY OF THE INVENTION

The present invention overcomes the disadvantages and limitations of the prior art by providing a simple method for eliminating the effects of the lips of a butt welded fusion joint. Prior to welding and during the facing operation normally performed as part of the welding process, a profile is cut into the inner diameter of the weld. When the weld is performed, the lips do not protrude into the inner diameter of the pipe. Alternatively, the profile may be designed so as to minimize the external protrusion of the lips.

The present invention may therefore comprise a method for joining a first plastic pipe to a second plastic pipe with at least a partially recessed internal bead comprising: placing the first plastic pipe in a holder; cutting the first plastic pipe substantially perpendicular to the axis of the first pipe with a profile that reduces the wall thickness of the first pipe with an undercut region on the internal side of the first pipe; cutting the second plastic pipe substantially perpendicular to the axis of the second pipe with a profile that reduces the wall thickness of the second pipe with an undercut region on the internal side of the second pipe; heating the ends of the first pipe and second pipe substantially simultaneously; and forcing the first pipe and second pipe together to form a weld, the weld having a bead that is substantially recessed within the undercut region of the first pipe and the undercut region of the second pipe.

The present invention may further comprise a fused butt joint with at least a partially recessed internal bead for plastic pipe comprising: a first pipe having an undercut region near the butt joint substantially axially symmetric and having a profile that is formed by cutting the first plastic pipe substantially perpendicular to the axis of the first pipe with a profile that reduces the wall thickness of the first pipe with an undercut region on the internal side of the first pipe; a second pipe having an undercut region near the butt joint substantially axially symmetric and having a profile that is formed by cutting the second plastic pipe substantially perpendicular to the axis of the second pipe with a profile that reduces the wall thickness of the second pipe with an undercut region on the internal side of the second pipe; and a bead formed by the heat fusing of the first pipe to the second pipe.

The present invention may further comprise a machine for butt welding a first plastic pipe to a second plastic pipe with at least a partially recessed internal bead comprising: a holder for receiving the first plastic pipe; a cutter adapted to cutting the first plastic pipe substantially perpendicular to the axis of the first pipe with a profile that reduces the wall thickness of the first pipe with an undercut region on the internal side of the first pipe; a holder for receiving the second plastic pipe; a cutter adapted to cutting the second plastic pipe substantially perpendicular to the axis of the second pipe with a profile that reduces the wall thickness of the second pipe with an undercut region on the internal side of the second pipe; a heater for heating the ends of the first pipe and second pipe substantially simultaneously; and a clamping mechanism for forcing the first pipe and second pipe together to form a weld, the weld having a bead that is substantially recessed within the undercut region of the first pipe and the undercut region of the second pipe.

The present invention may further comprise a machine for butt welding a first plastic pipe to a second plastic pipe with at least a partially recessed external bead comprising: a holder for receiving the first plastic pipe; a cutter adapted to cutting the first plastic pipe substantially perpendicular to the axis of the first pipe with a profile that reduces the wall thickness of the first pipe with an undercut region on the external side of the first pipe; a holder for receiving the second plastic pipe; a cutter adapted to cutting the second plastic pipe substantially perpendicular to the axis of the second pipe with a profile that reduces the wall thickness of the second pipe with an undercut region on the external side of the second pipe; a heater for heating the ends of the first pipe and second pipe substantially simultaneously; and a clamping mechanism for forcing the first pipe and second pipe together to form a weld, the weld having a bead that is substantially recessed within the undercut region of the first pipe and the undercut region of the second pipe.

The advantages of the present invention are that fused butt joints may be produced to minimize the mechanical interference of the lips produced by the butt joint process. The butt joints may be manufactured without adding any production time or cost to the manufacturing process. The apparatus for making the joints may be adjustable or rigidly mounted, depending on the application and needs of the production process.

DETAILED DESCRIPTION OF THE INVENTION

Figure 1:
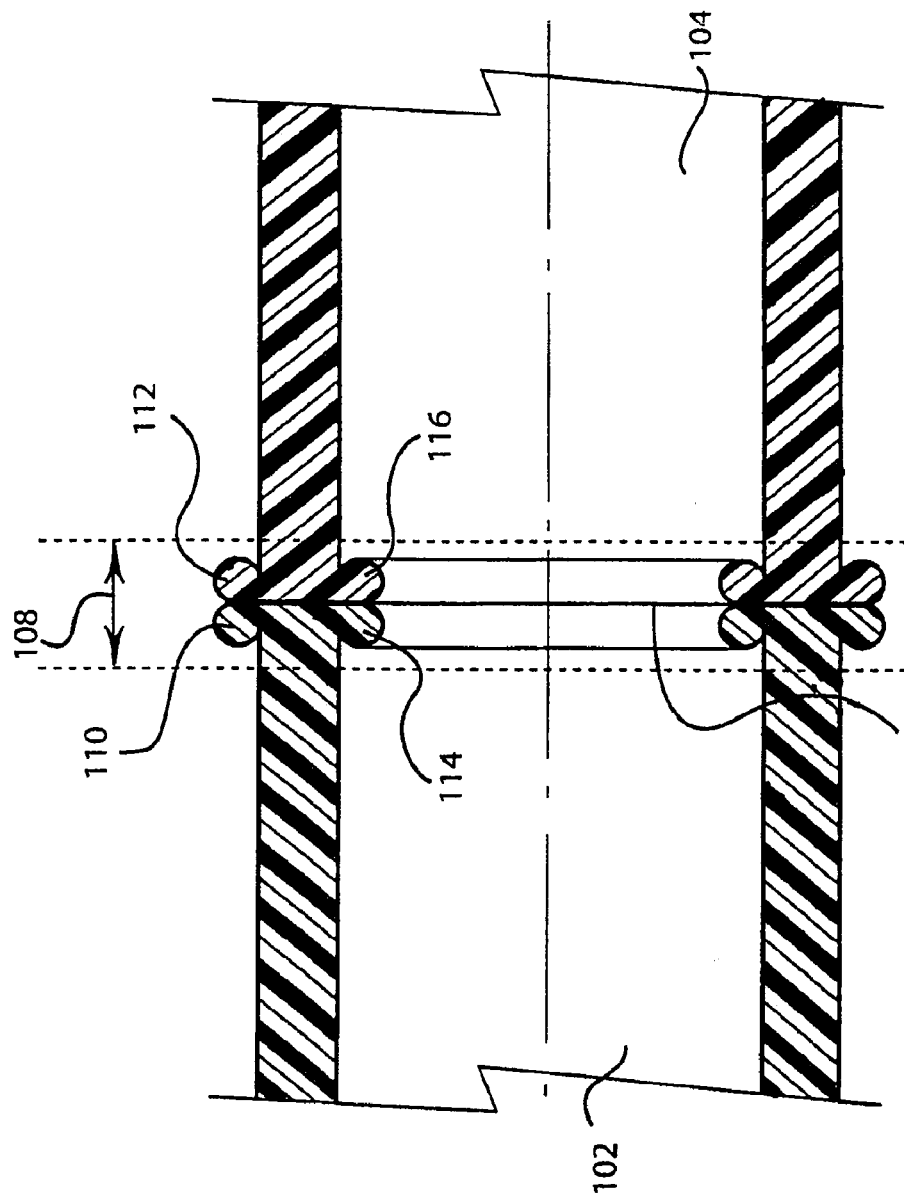
FIG. 1 is an illustration of a cross section of a butt joint common in the industry.
Figure 2A:
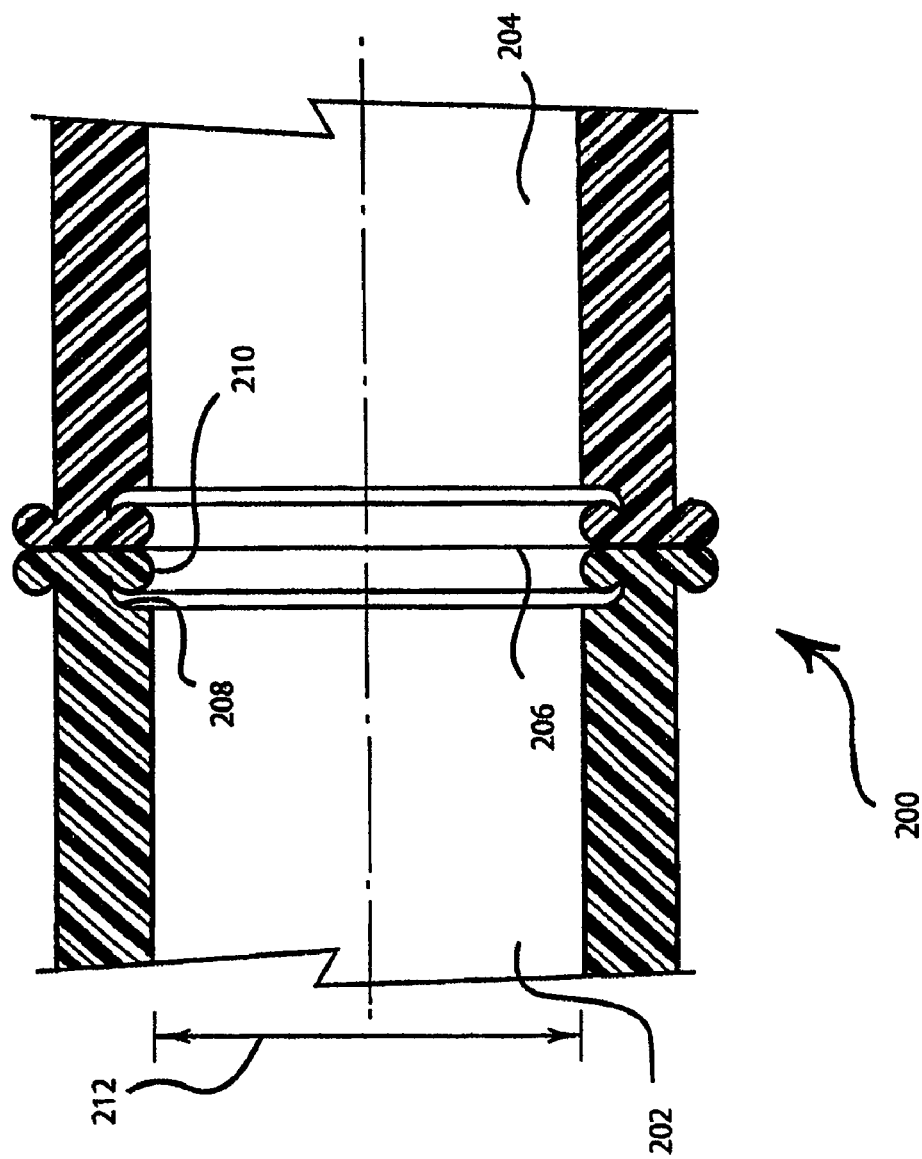
FIG. 2A is an illustration of a cross section of embodiment of the present invention wherein a first pipe is joined to a second pipe with an undercut region in the inner diameter.

FIG. 2A illustrates a cross section of embodiment 200 of the present invention wherein a first pipe 202 is joined to a second pipe 204 along the fusion weld line 206. Pipe 202 has an undercut area 208 that allows the inner lip 210 to be recessed below the normal inner diameter 212.

The recessed area 208 in the present invention is formed during the normal facing operation as explained hereinafter. The shape of the recessed area 208 is selected so that the inner lip 210 may be partially or fully recessed below the inner diameter 212 of the pipe. The recessed lip allows fluids to flow through past the joint with a minimum of obstruction to collect solids and other items such as in sewer applications. In other applications, the recessed lip allows a bundle of wires, fiber optic cables, or other conductors to use the full inner diameter of the pipe. When the pipe is used as a protective conduit, the recessed lips may make it easier to install the cables or transmission lines, as the lips may not catch or impede the installation of the cables.

In applications such as conduits and sewers, the pipe is generally not pressurized. The strength of the joint is typically only stressed when the pipe is handled as it is being placed underground for burial. Once the pipe is in place and buried, very little forces are acting on the joint. This is in contrast to pressurized situations such as natural gas where the pipe may undergo more stress in normal service than during installation.

The applications where the inner lips pose a problem also tend to be those applications where the strength of the joint is not paramount. Hence, the present invention provides improved functionality while still meeting the minimum strength requirements.

Figure 2B:
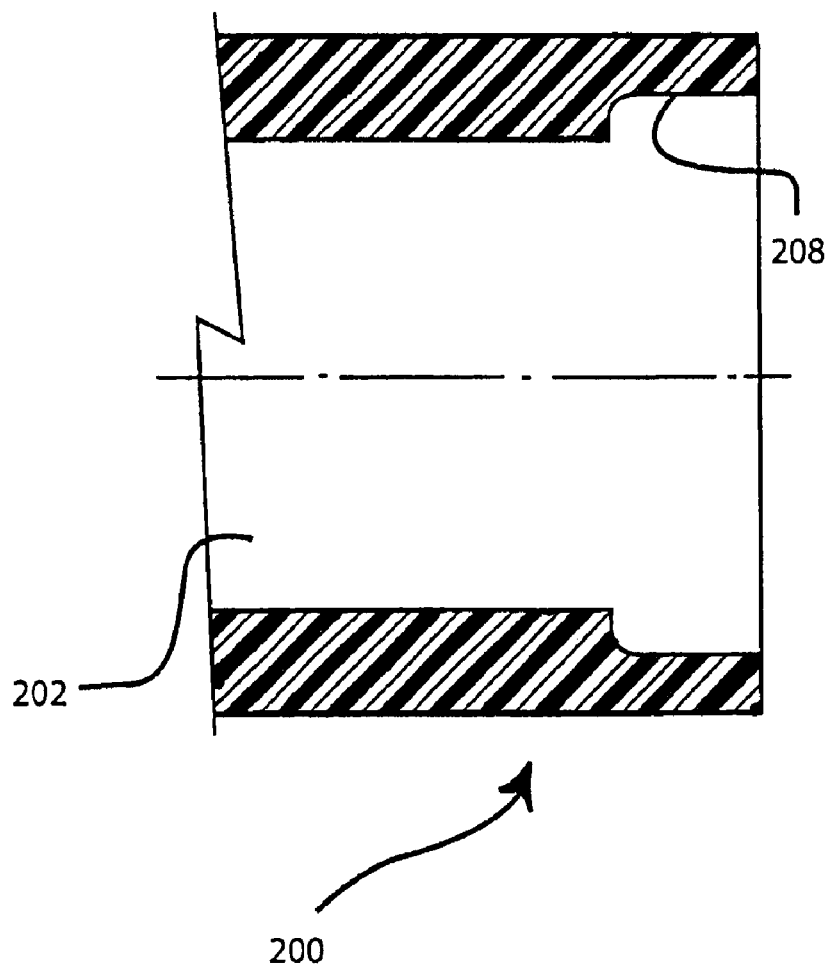
FIG. 2B is an illustration of a cross section of the pipe of FIG. 2A prior to welding.

FIG. 2B illustrates a cross section of embodiment 200 of the present invention showing pipe 202 prior to welding. Recessed area 208 is shown in this view.

Figure 3A:
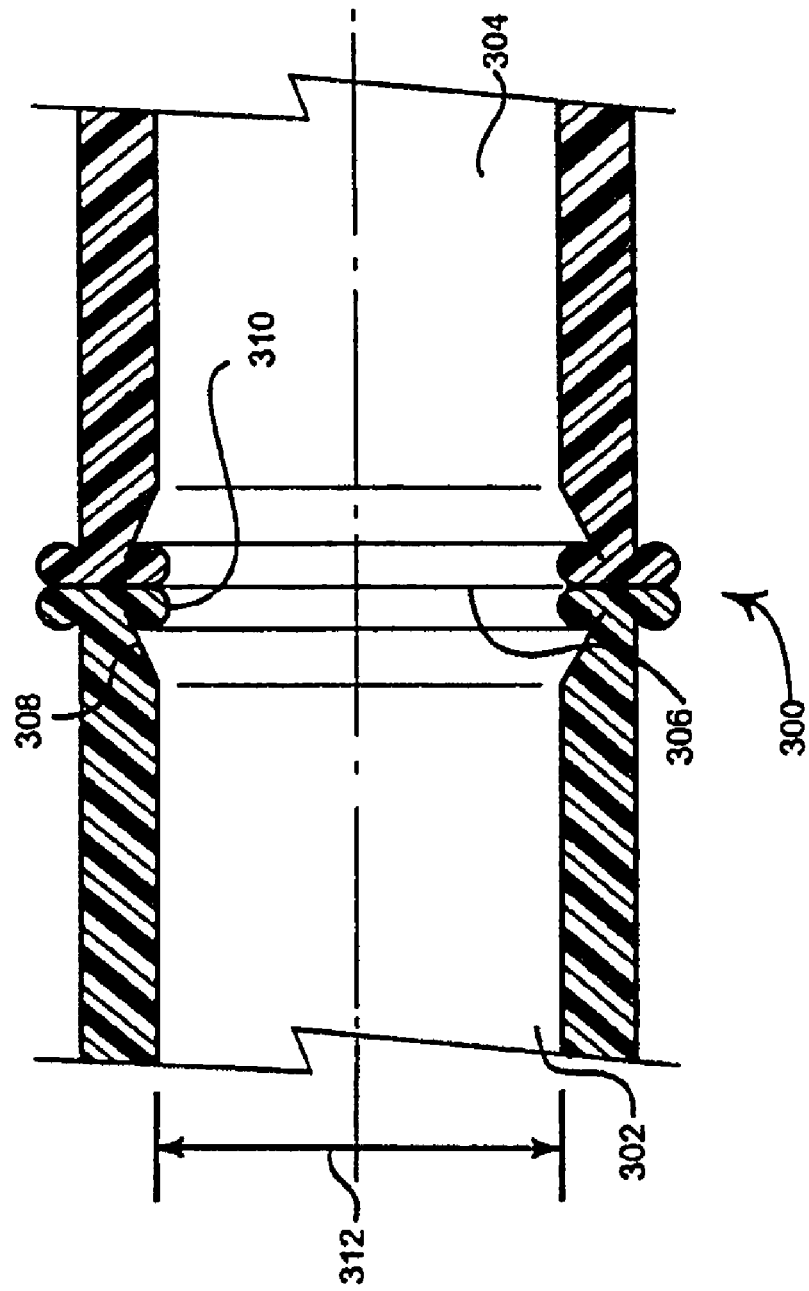
FIG. 3A is an illustration of a cross section of embodiment of the present invention wherein a first pipe is joined to a second pipe with a beveled region in the inner diameter.

FIG. 3A illustrates a cross section of embodiment 300 of the present invention wherein a first pipe 302 is joined to a second pipe 304 along the fusion weld line 306. Pipe 302 has a beveled area 308 that allows the inner lip 310 to be recessed below the normal inner diameter 312.

Figure 3B:
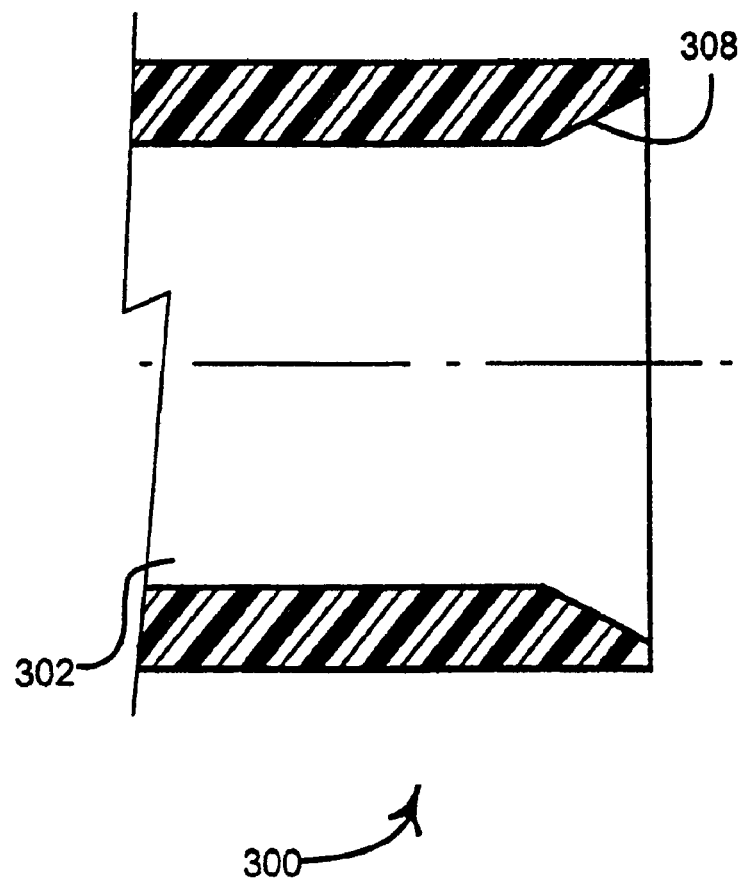
FIG. 3B is an illustration of a cross section of the pipe of FIG. 3A prior to welding.

FIG. 3B illustrates a cross section of embodiment 300 of the present invention showing pipe 302 prior to welding. Beveled area 308 is shown in this view.

Embodiment 300 is similar to embodiment 200 in all aspects except that the shape of the recessed area is varied. Various shapes for the recessed area may be developed by those skilled in the art while maintaining within the scope and intent of the present invention. For example, bevels of various angles and depths may be used. Curved, straight, angled, or other shaped sections may also be used.

Figure 4A:
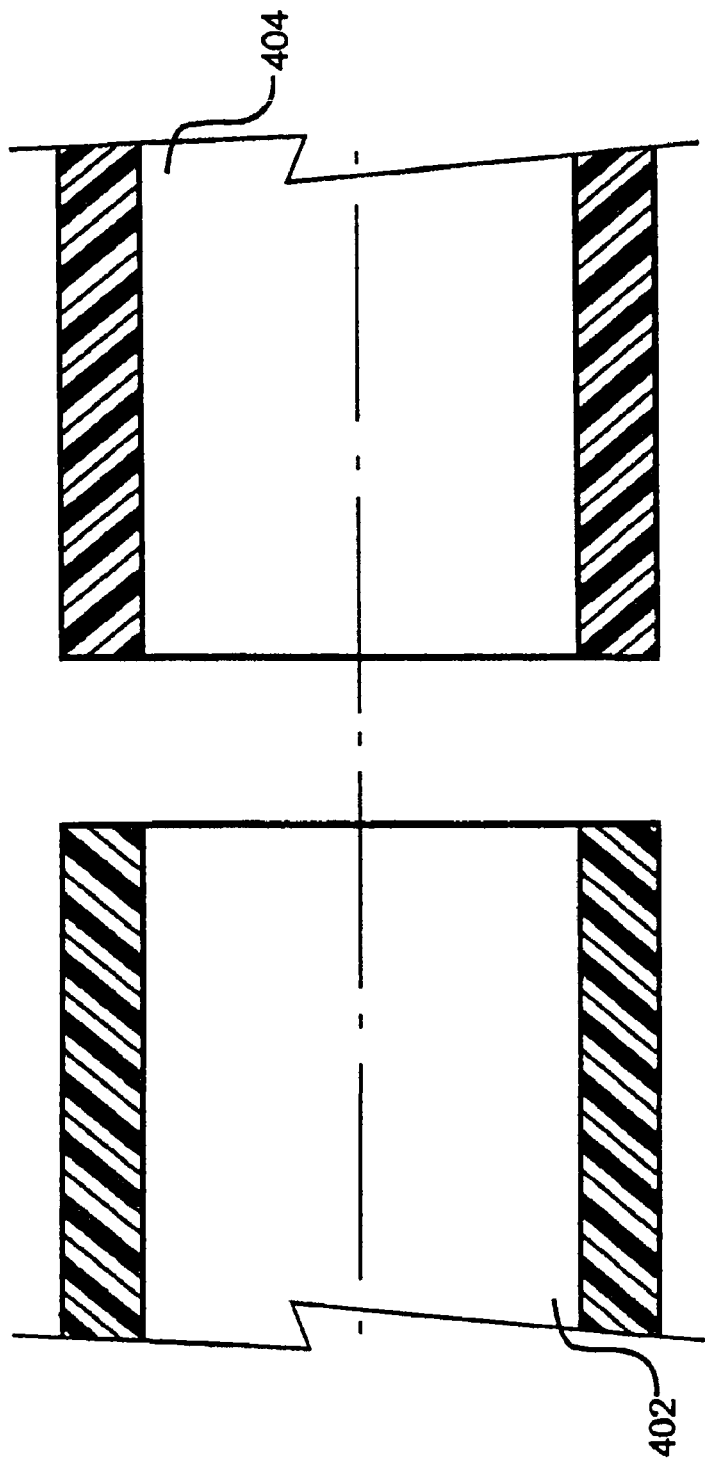
FIG. 4A is an illustration of a cross section of two sections of pipe prior to welding.

FIG. 4A illustrates a cross section of a first section of pipe 402 and a second section of pipe 404 prior to welding. The sections of pipe 402 and 404 are typically clamped into a fixture during the process described herein.

Figure 4B:
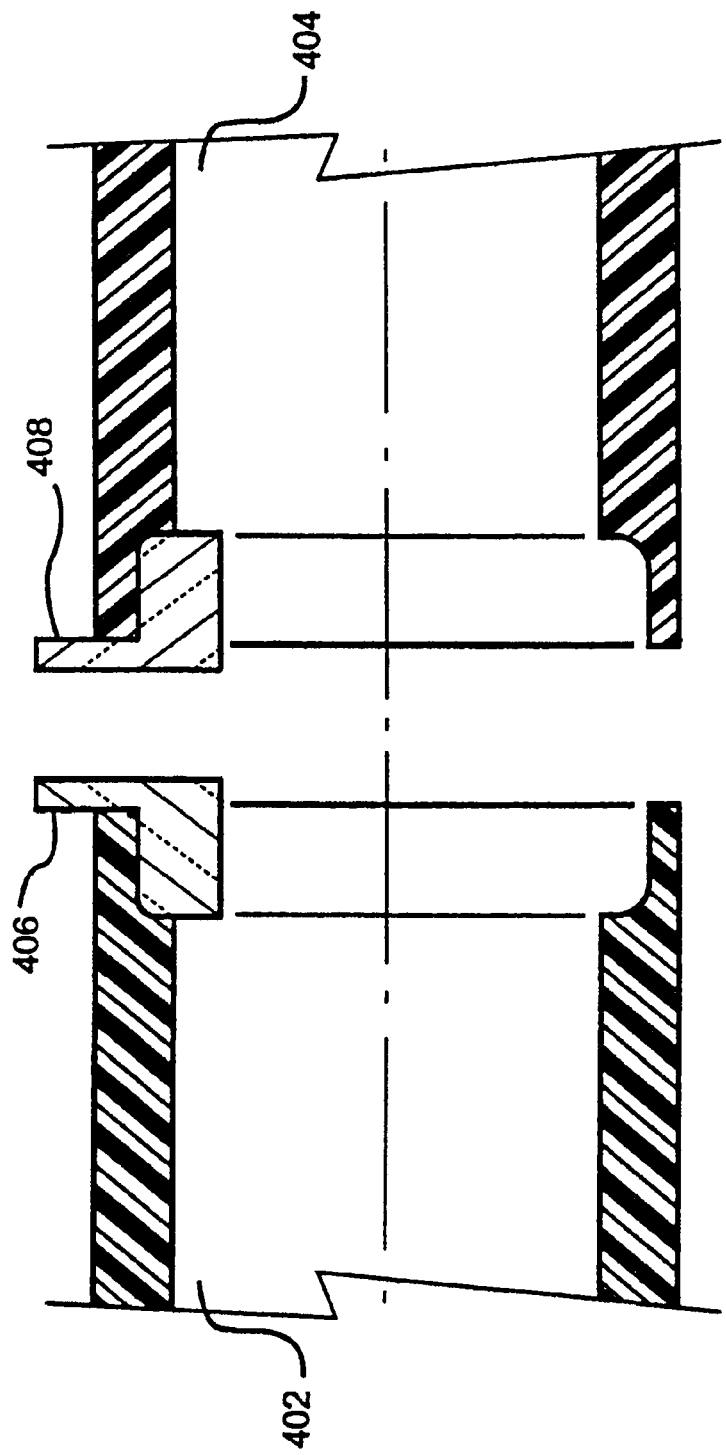
FIG. 4B is an illustration of the cross section of FIG. 4A wherein shaped cutters are used to cut a profile into the inner diameter of the pipes.

FIG. 4B illustrates a cross section of pipes 402 and 404 wherein shaped cutters 406 and 408 are used to cut a profile into the center of the respective pipes. The shaped cutters 406 and 408 may be simultaneously applied to the two pipes 402 and 404 during the cutting process. The cutting process removes any abnormalities, burrs, dirt, or other items that may effect the quality of the weld. Since the pipes 402 and 404 are rigidly held in a fixture during the welding process, the cutting process of FIG. 4B ensures that the pipes 402 and 404 will be perpendicular and square for the welding process.

In some embodiments, the cutting process may continue until an operator inspects the pipe to determine that the full face of the pipe has been cut properly. The operator may need to adjust the position of the pipe and recut the pipe if one or more of the pipes were severely gashed or some other abnormality. In other embodiments, the cutting may continue until the holding mechanism is pressed up against a hard stop, a sensor is tripped, or otherwise the cut ends of the pipe were brought to a known location.

Figure 4C:
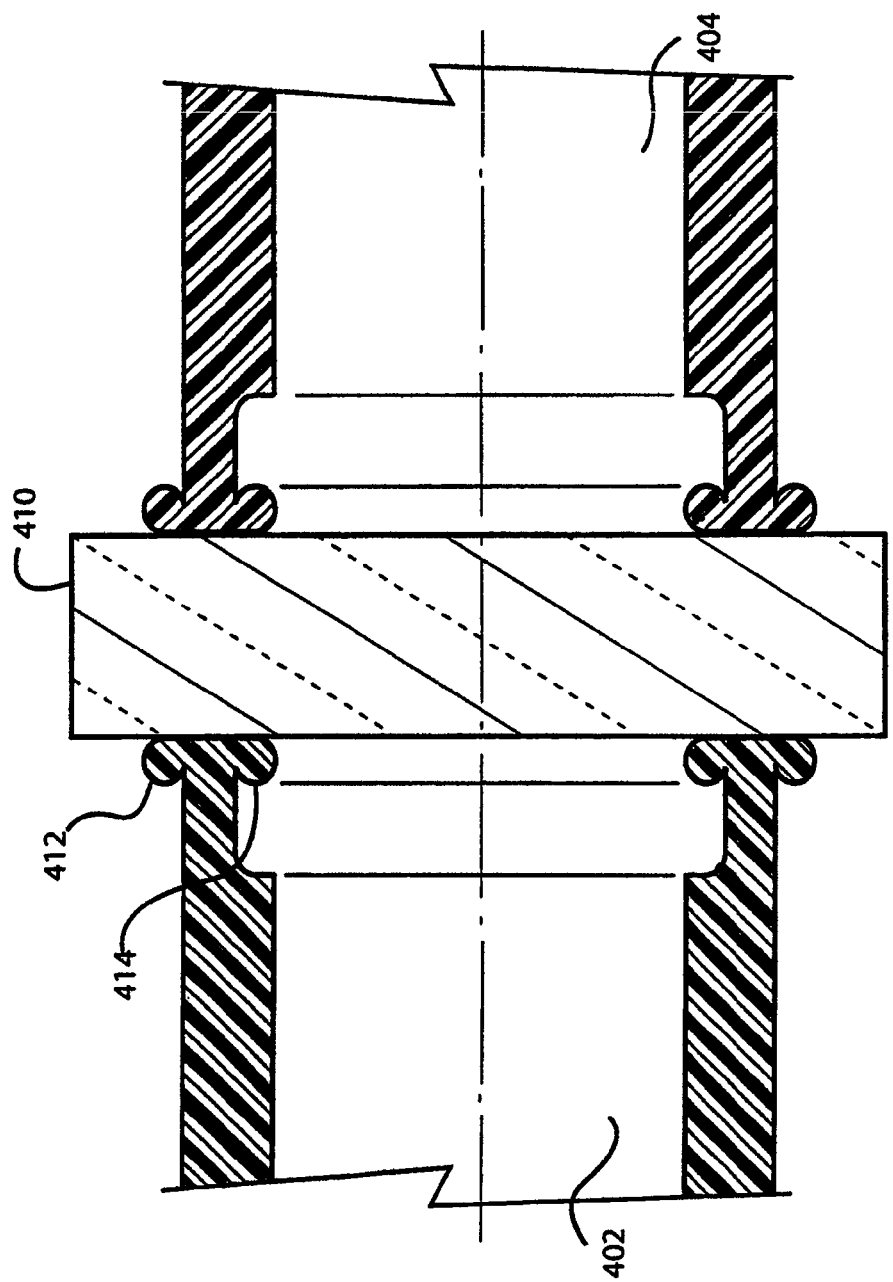
FIG. 4C is an illustration of the cross section of FIG. 4B wherein the pipes are pressed against a hot plate.

FIG. 4C illustrates a cross section of pipes 402 and 404 wherein the pipes are pressed against a hot plate 410. As the pipe 402 heats up against the hot plate 410, lips 412 and 414 begin to form.

In some embodiments, the pipes 402 and 404 are pressed against the hot plate 410 for a specified time and held against the hot plate at a specified force. As the plastic pipes 402 and 404 melt, the pressure against the plate forms the lips 412 and 414. In other embodiments, the pipes 402 and 404 may be held against the hot plate 410 for a specified time, but the pipes 402 and 404 may allowed to squeeze against the hot plate 410 until a hard stop is reached. Such an embodiment may limit the size of the lips 412 and 414 before the fusion process occurs.

Figure 4D:
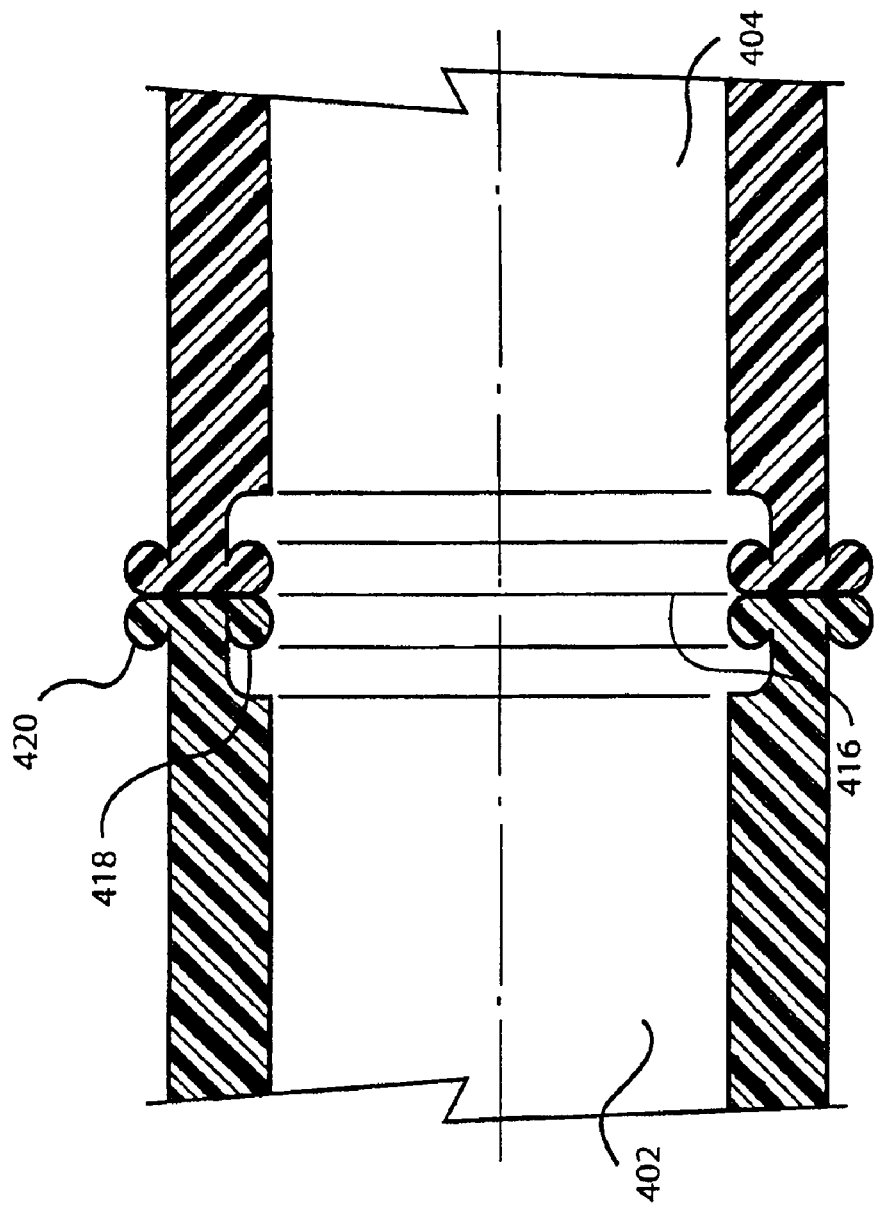
FIG. 4D is an illustration of the cross section of FIG. 4C wherein the pipes are pressed against each other to form a weld.

FIG. 4D illustrates a cross section of pipes 402 and 404 wherein the pipes are pressed against each other to form a weld along the weld line 416. As the pipes 402 and 404 are pressed together, the lips 418 and 420 grow larger as the fusion occurs.

In some embodiments, the pipes 402 and 404 may be pressed against each other at a specified pressure and held for a specified time. As the pipes 402 and 404 are pressed together, the plastic of each pipe fuses against the other pipe, forming a weld. At the same time, the joint cools rapidly and sets up. In some embodiments, when the pipes 402 and 404 are pressed together, the pipes 402 and 404 may be pressed towards each other until a stop is reached. Such an embodiment may be result in more consistent sized lips 418 and 420 from joint to joint.

The joint 416 may be cooled passively or actively. The passive cooling may amount to holding the fused pipe in the machine for a certain period of time to allow the pipe to be handled. In embodiments with active cooling, a cool air supply, water mist, or other active cooling method may be applied to the joint 416

Figure 5:
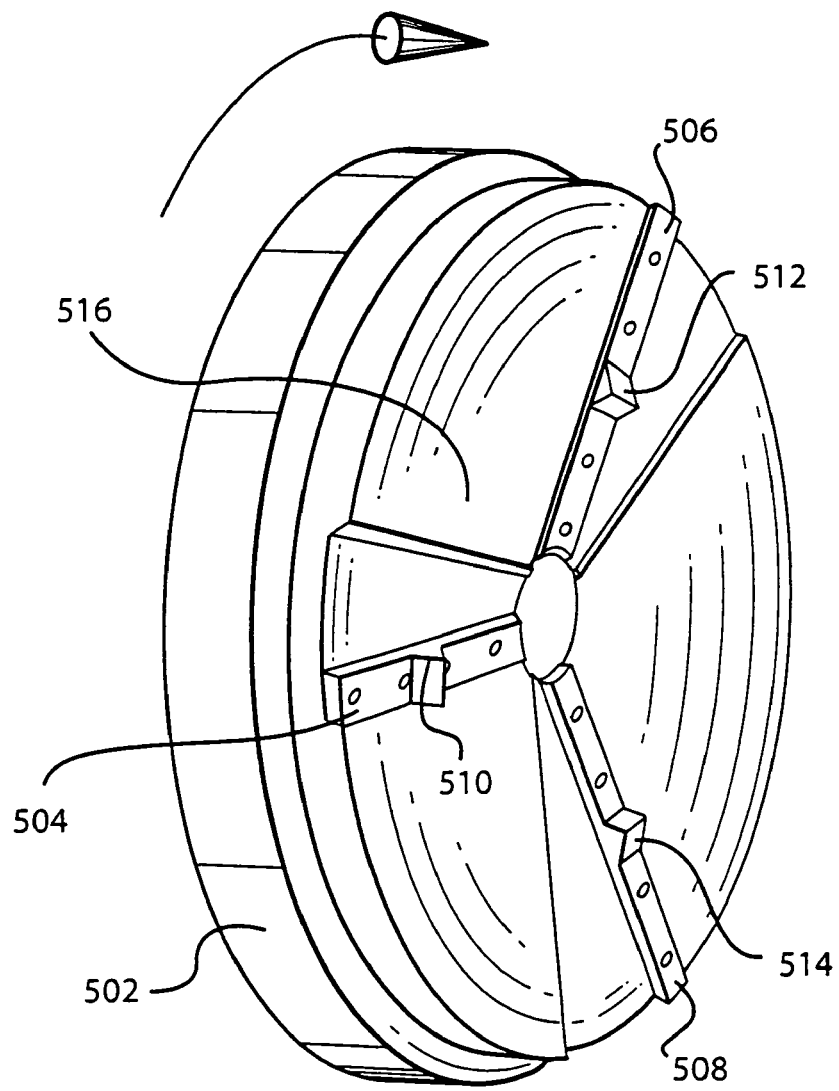
FIG. 5 is an illustration of a perspective view of an embodiment of the present invention of a facing cutter configured with specialized cutting blades.

FIG. 5 illustrates a perspective view of a facing cutter 502 typically used in industry, configured with an embodiment of specialized cutting blades 504, 506, and 508. The blade 504 has a profile area 510 that is adapted to cut a bevel on the inner diameter of a pipe to be welded. The blades 506 and 508 have similar profile areas 512 and 514, respectively.

In the present embodiment, the blades are fixed and cannot be moved. Because the profile is fixed, the profile that is made in each pipe will be consistent from cut to cut. Further, since the blades may be located with a pin to the faceplate 516, the profile will be consistent even when the blades are changed for service.

Various blade configurations may be created for various applications. For example, the blade configurations may be adapted to cut a profile on the outer diameter of the pipe, the inner diameter of the pipe, or both the outer and inner diameter. Various shapes are also possible, including chamfers, rounded profiles, straight undercut profiles, and various combinations of geometries. In some embodiments, a first blade may cut an internal profile and a second blade may cut an external profile. In other embodiments, the blade profile may include both the internal and external profile.

Figure 6:
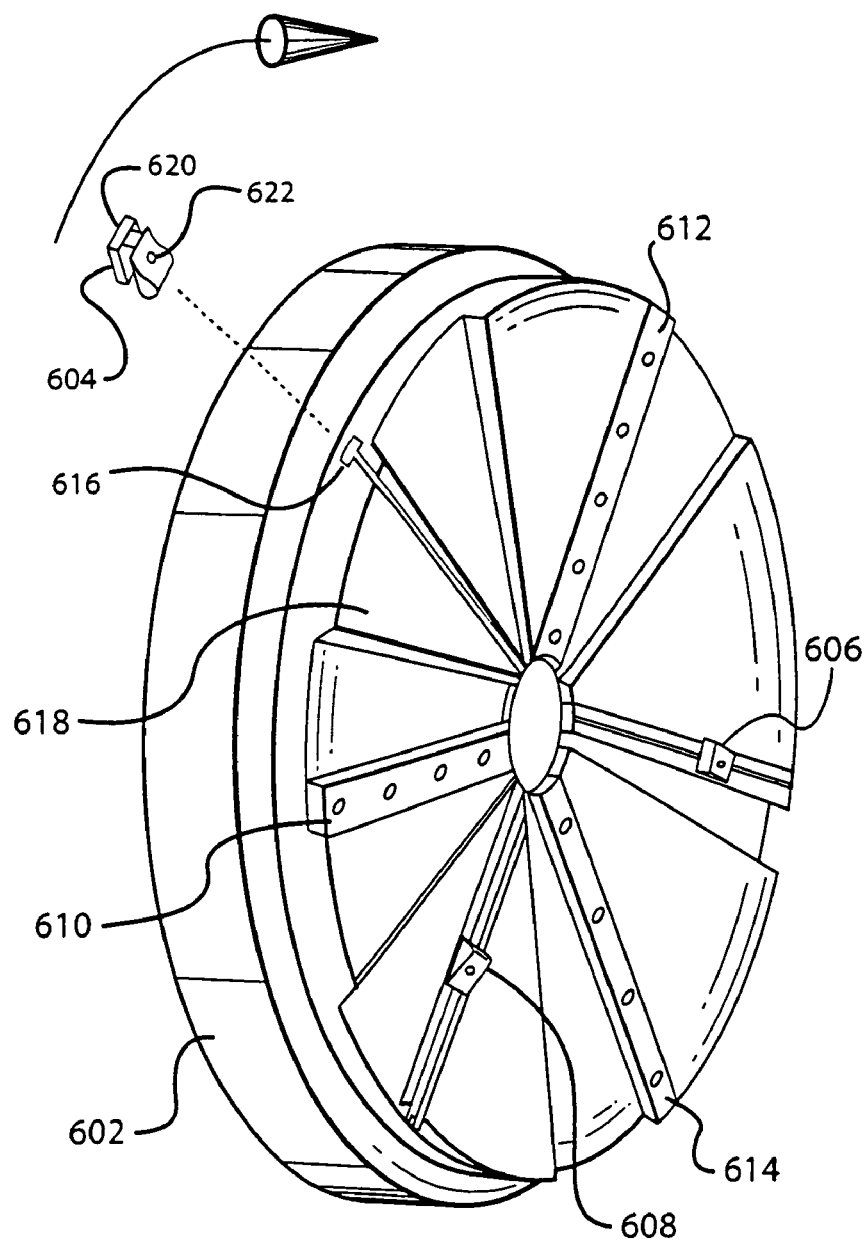
FIG. 6 is an illustration of a perspective view of an embodiment of the present invention of a facing cutter configured with specialized cutting blades wherein the blades are adjustable.

FIG. 6 illustrates a perspective view of a facing cutter 602 typically used in industry, configured with a movable embodiment of specialized cutting blades 604, 606, and 608. The standard cutting blades 610, 612, and 614 machine the perpendicular surface of the pipe. The specialized cutting blades 604, 606, and 608 machine a profile into the inner diameter of the pipe being cut.

The cutting blade 604 is shown exploded from the facing cutter 602. A T-slot 616 in the faceplate 618 engages the T-shaped feature 620. A set screw 622 locks the cutting blade 604 into position.

Various blade shapes may be created for various applications. For example, the blade configurations may be adapted to cut a profile on the outer diameter of the pipe, the inner diameter of the pipe, or both the outer and inner diameter. Various shapes are also possible, including chamfers, rounded profiles, straight undercut profiles, and various combinations of geometries. In some embodiments, a first blade may cut an internal profile and a second blade may cut an external profile. In other embodiments, the blade profile may include both the internal and external profile.

The movable cutting blades have the advantage that any size pipe may be cut on the inventive device. However, the disadvantage is that the cutting blades 604 may need to be accurately positioned so that they produce a uniform cut.

In some embodiments, special locating features in the faceplate 618 may be engaged by locating features of the movable cutting blades to that the cutting blades may be accurately and repeatably positioned. Those skilled in the arts may use various designs of positioning and locating mechanisms to achieve the equivalent results without violating the spirit or intent of the present invention.

Figure 7A:
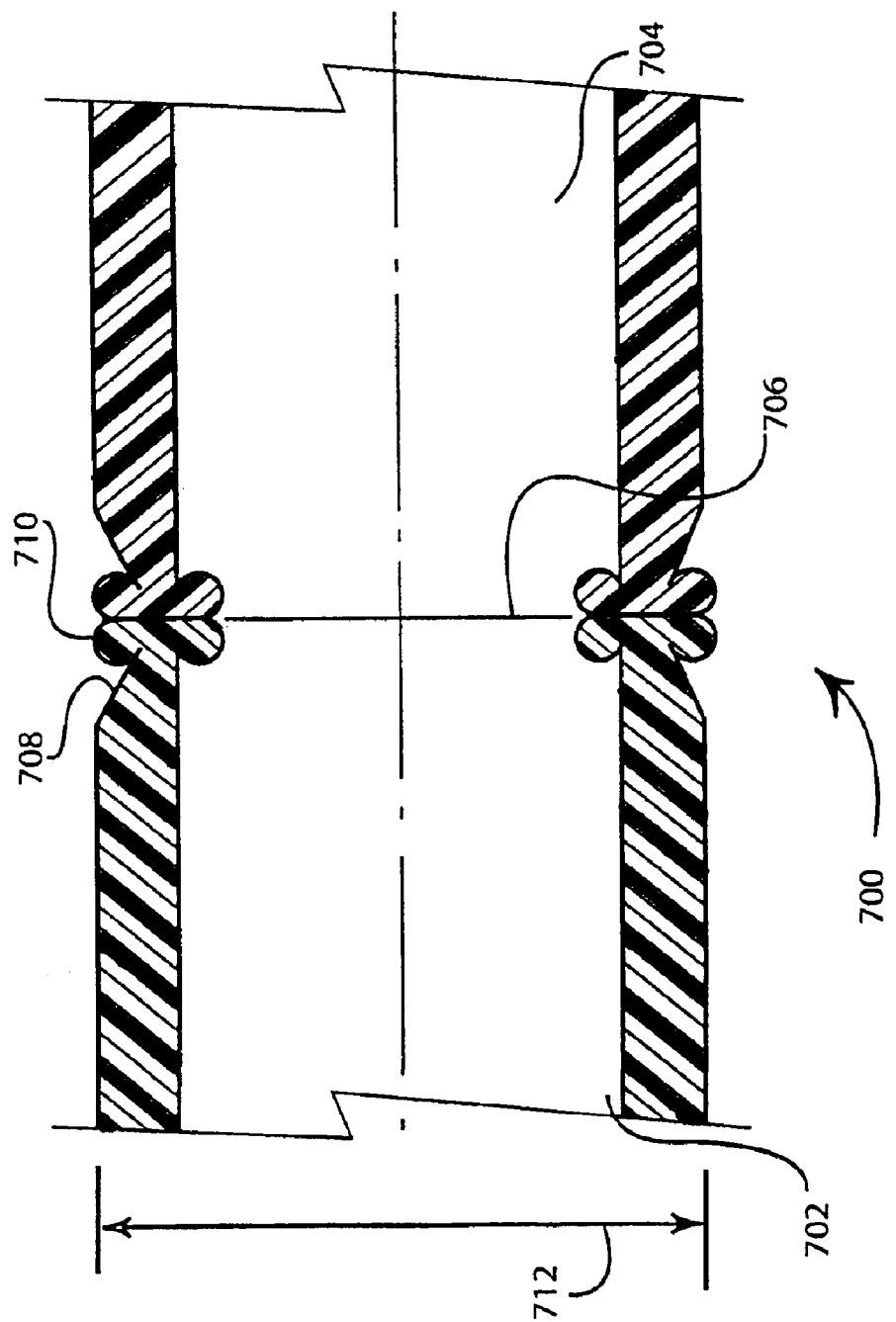
FIG. 7A is an illustration of a cross section of embodiment of the present invention wherein a first pipe is joined to a second pipe with a beveled region in the outer diameter.

FIG. 7A illustrates a cross section of embodiment 700 of the present invention wherein a first pipe 702 is joined to a second pipe 704 along the fusion weld line 706. Pipe 702 has a beveled area 708 that allows the outer lip 710 to be recessed below the normal outer diameter 712.

Figure 7B:
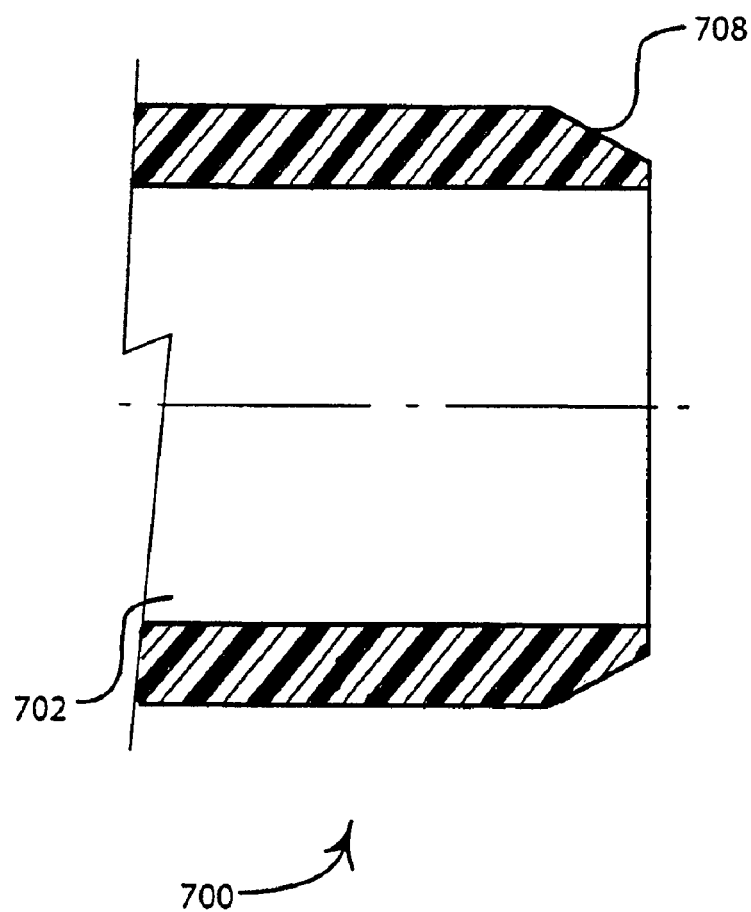
FIG. 7B is an illustration of a cross section of the pipe of FIG. 7A prior to welding.

FIG. 7B illustrates a cross section of embodiment 700 of the present invention showing pipe 702 prior to welding. Beveled area 708 is shown in this view.

The embodiment 700 is applicable to applications where the lips on the exterior side of the pipe are problematic, such as when the assembled pipe is handled through a conveyor mechanism, feeding mechanisms, transportation devices, or other apparatus where a circumferential lip may catch or impede the movement of the pipe. It is common practice to manually cut off the lips after the welding process if the lips are problematic. The present embodiment eliminates the secondary process and hence cost of removing the lips.

Figure 8A:
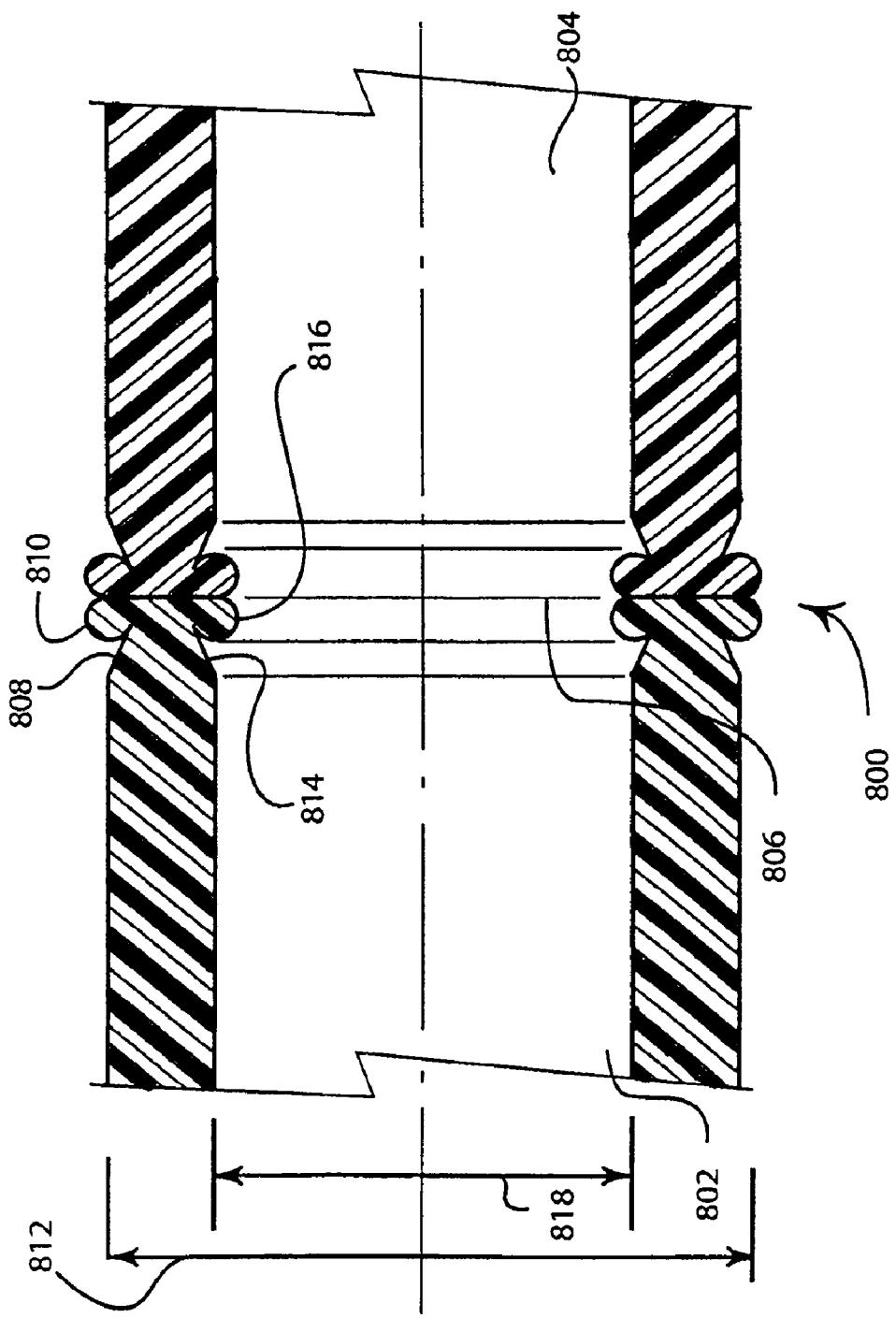
FIG. 8A is an illustration of a cross section of embodiment of the present invention wherein a first pipe is joined to a second pipe with a beveled region on both the inner and outer diameter.

FIG. 8A illustrates a cross section of embodiment 800 of the present invention wherein a first pipe 802 is joined to a second pipe 804 along the fusion weld line 806. Pipe 802 has an external beveled area 808 that allows the outer lip 810 to be recessed below the normal outer diameter 812. Pipe 802 has an internal beveled area 814 that allows the inner lip 816 to be recessed below the normal inner diameter 818.

Figure 8B:
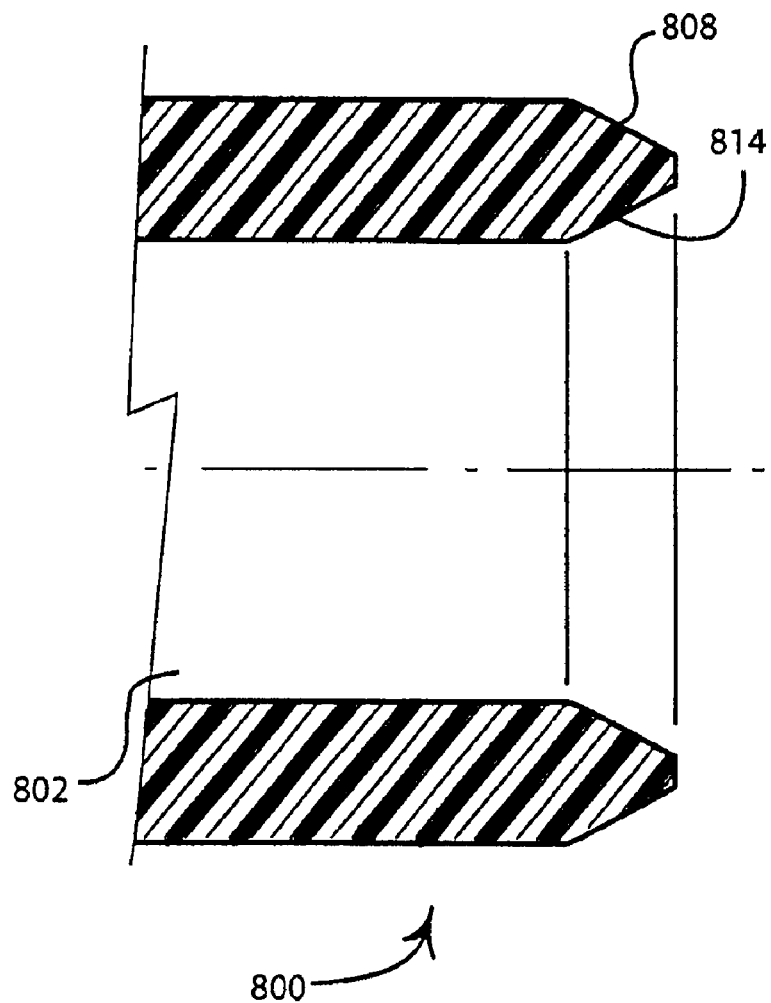
FIG. 8B is an illustration of a cross section of the pipe of FIG. 8A prior to welding.

FIG. 8B illustrates a cross section of embodiment 800 of the present invention showing pipe 802 prior to welding. Beveled areas 808 and 814 are shown in this view.

Embodiment 800 is suited to applications where both the internal and external lips pose problems to the functionality of the welded pipe. Such applications may be for a telecommunications conduit that is installed using an installation apparatus that may be adversely caught by a lip on the outside.

The various embodiments exemplify how at least a portion of the bead formed by a butt joint may be recessed. An internally recessed bead may avoid problems with feeding material through the pipe while an externally recessed bead may avoid problems with handling the pipe from the outside. The embodiments allow at least part of the bead to be recessed. In some embodiments, only a slight portion of the bead will be recessed while in other embodiments the whole bead will be recessed significantly.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A fused butt joint comprising:
   a first plastic pipe having a normal inner diameter and an interior wall, said pipe having an undercut region on the interior wall near said butt joint;
   a second plastic pipe having a normal inner diameter and an interior wall, said pipe having an undercut region on the interior wall near said butt joint; and
   a bead formed by the heat fusing of said first pipe to said second pipe, said bead being disposed within only a portion of each of the undercut regions of said first and second pipes.

2. The fused butt joint of claim 1 wherein said undercut region of said first pipe comprises a substantially cylindrical surface parallel to the longitudinal axis of said first pipe with a length along said axis at least as great as the difference between the diameter of said first pipe at said cylindrical surface and the normal inner diameter of said first pipe.

3. The fused butt joint of claim 1, wherein said bead extends below the normal inner diameters of said first and second pipes.

4. A fused butt joint comprising:
   a first plastic pipe having interior and exterior walls, said pipe having undercut regions on the interior and exterior walls thereof near said butt joint;
   a second plastic pipe having interior and exterior walls, said pipe having undercut regions on the interior and exterior walls thereof near said butt joint; and
   an interior bead and an exterior bead disposed within only a portion of the undercut regions of the interior and exterior walls, respectively, of said first and second pipes.

5. The fused butt joint of claim 4, the first and second pipes each having a normal inner diameter, wherein said interior beads extend below the normal inner diameter of said first and second pipes.

6. A fused butt joint comprising:
   a first plastic pipe having a normal outer diameter and an exterior wall, said pipe having an undercut region on the exterior wall thereof near said butt joint;
   a second plastic pipe having a normal outer diameter and an exterior wall, said pipe having an undercut region on the exterior wall thereof near said butt joint; and
   a bead formed by the heat fusing of said first pipe to said second pipe, said bead being disposed within only a portion of each of the undercut regions of said first and second pipes.

* * * * *